United States Patent
Sharma

(10) Patent No.: US 9,137,724 B1
(45) Date of Patent: Sep. 15, 2015

(54) METHODS AND APPARATUS FOR LOAD BALANCING IN HIGH DENSITY DEPOLYMENTS OF WIRELESS ACCESS POINTS ACCORDING TO SPATIAL STREAM CAPABILITIES

(71) Applicant: Chandra Prakash Sharma, Bangalore (IN)

(72) Inventor: Chandra Prakash Sharma, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 13/723,550

(22) Filed: Dec. 21, 2012

(51) Int. Cl.
*H04W 36/22* (2009.01)
*H04W 80/04* (2009.01)
*H04W 88/08* (2009.01)

(52) U.S. Cl.
CPC .............. *H04W 36/22* (2013.01); *H04W 88/08* (2013.01); *H04W 80/04* (2013.01)

(58) Field of Classification Search
None
See application file for complete search history.

(56) References Cited

U.S. PATENT DOCUMENTS

| | | | |
|---|---|---|---|
| 6,664,925 B1* | 12/2003 | Moore et al. ................... | 342/451 |
| 7,236,471 B2* | 6/2007 | Backes et al. .................. | 370/328 |
| 7,539,169 B1* | 5/2009 | O'Hara et al. ................. | 370/338 |
| 7,969,910 B2* | 6/2011 | Barak et al. .................... | 370/254 |
| 8,009,578 B2* | 8/2011 | Kishigami et al. ............. | 370/252 |
| 8,416,722 B2* | 4/2013 | Suzuki ........................... | 370/310 |
| 8,427,942 B2* | 4/2013 | Kim et al. ...................... | 370/229 |
| 8,451,752 B2* | 5/2013 | Lu .................................. | 370/254 |
| 8,660,497 B1* | 2/2014 | Zhang et al. .................. | 455/63.1 |
| 8,675,599 B2* | 3/2014 | Nam et al. ..................... | 370/331 |
| 2004/0156399 A1* | 8/2004 | Eran .............................. | 370/913 |
| 2005/0213579 A1* | 9/2005 | Iyer et al. .................... | 370/395.2 |
| 2008/0085723 A1* | 4/2008 | Tsao et al. ................. | 455/452.2 |
| 2010/0067401 A1* | 3/2010 | Medvedev et al. ............ | 370/253 |
| 2011/0096683 A1* | 4/2011 | Suzuki .......................... | 370/252 |
| 2012/0230189 A1* | 9/2012 | Fang et al. .................... | 370/230 |

* cited by examiner

*Primary Examiner* — Hong Cho
(74) *Attorney, Agent, or Firm* — Cooley LLP

(57) ABSTRACT

A method includes receiving a signal indicative that a first access point can transmit data over a first number of spatial streams, and a second access point can transmit data over a second number of spatial streams. The method includes receiving a probe request from a set of client devices. A first portion of the set of client devices is configured to transmit data over the first number of spatial streams and a second portion of the client devices is configured to transmit data over the second number of spatial streams. The method includes sending a signal to the first portion associated with authorizing the first portion to connect to the first access point and sending a signal to the second portion associated with authorizing the second portion to connect to the second access point.

20 Claims, 4 Drawing Sheets

METHODS AND APPARATUS FOR LOAD BALANCING IN HIGH DENSITY DEPOLYMENTS OF WIRELESS ACCESS POINTS ACCORDING TO SPATIAL STREAM CAPABILITIES

BACKGROUND

Some embodiments described herein relate generally to load balancing of wireless access points. More particularly, some embodiments described herein relate to systems and methods for efficient radio frequency (RF) load balancing in high density deployments of wireless access points according to spatial stream capabilities.

More and more networks are established via wireless communication. In some instances, wireless access points (WAPs) are configured to connect wireless client devices with other portions of a wireless local area network (WLAN). In such instances, a WAP and the client devices can form a basic service set (BSS). In the simplest form, the WAP can act as a master to control the client devices within the BSS and to provide access to the network. In some instances, an extended service set (ESS) can be established by interconnecting multiple BSSs. For example, in some instances, the interconnected BSSs can operate on the same channel with a minimal overlap to expand the coverage of the wireless network.

With the evolution of mobile computing and communication devices (e.g., laptops, tablet personal computers (PCs), smart phones, personal digital assistants (PDAs), or the like), the number of client devices attempting to connect to such ESSs has dramatically increased. In an effort to accommodate a higher density of client devices, an ESS can be established by interconnecting multiple BSSs operating on different channels and having an overlapping coverage. For example, in some instances, multiple WAPs can be connected to provide the client devices access to the network. In such instances, RF load balancing techniques can be used to control the association of client devices to a specific WAP included in the ESS. For example, in some instances, a wireless controller can perform RF load balancing based on the number of client devices connected to a WAP. In such instances, a WAP with a higher number of client devices connected thereto at a given time can be more difficult to access than a WAP with a lower number of connected client devices.

In some instances, the wireless controller can perform RF load balancing based on the load present on a WAP. For example, in some instances, a WAP can be connected to a client device with a high bandwidth such that the load on the WAP is greater than a load on a second WAP included in the ESS. In such instances, the wireless controller can prevent additional client devices from connecting to the WAP with the higher load regardless of the number of client devices connected thereto.

In some instances, wireless access points having differing spatial stream capabilities can be interconnected to form an ESS. For example, an ESS can include WAPs capable of transmitting one, two, or three spatial streams. Known RF load balancing techniques, however, generally ignore the throughput capabilities of the WAPs and the client devices and, therefore, do not associate the spatial stream capabilities of the client devices with the spatial stream capabilities of the WAPs. For example, in some instances a wireless controller may associate a client device capable of transmitting three spatial streams with a WAP capable of transmitting a single spatial stream. In this manner, the potential throughput of the client device is not realized.

Thus, a need exists for improved systems and methods of RF load balancing in high density deployments according to spatial stream capabilities.

SUMMARY

Methods and apparatus for balancing a RF load in high density deployments according to spatial stream capabilities are described herein. In some embodiments, a method includes receiving at least one signal indicative that a first access point can transmit data over a first number of spatial streams, and a second access point can transmit data over a second number of spatial streams less than the first number of spatial streams. The method further includes receiving a probe request from each client device included in a set of client devices. The set of client devices includes a first portion of client devices configured to transmit data over the first number of spatial streams and a second portion of client devices configured to transmit data over the second number of spatial streams. The method includes sending a signal to each client device in the first portion associated with authorizing the client devices to connect to the first access point. The method further includes sending a signal to each client device in the second portion associated with authorizing the client devices to connect to the second access point.

DETAILED DESCRIPTION

Figure 1:
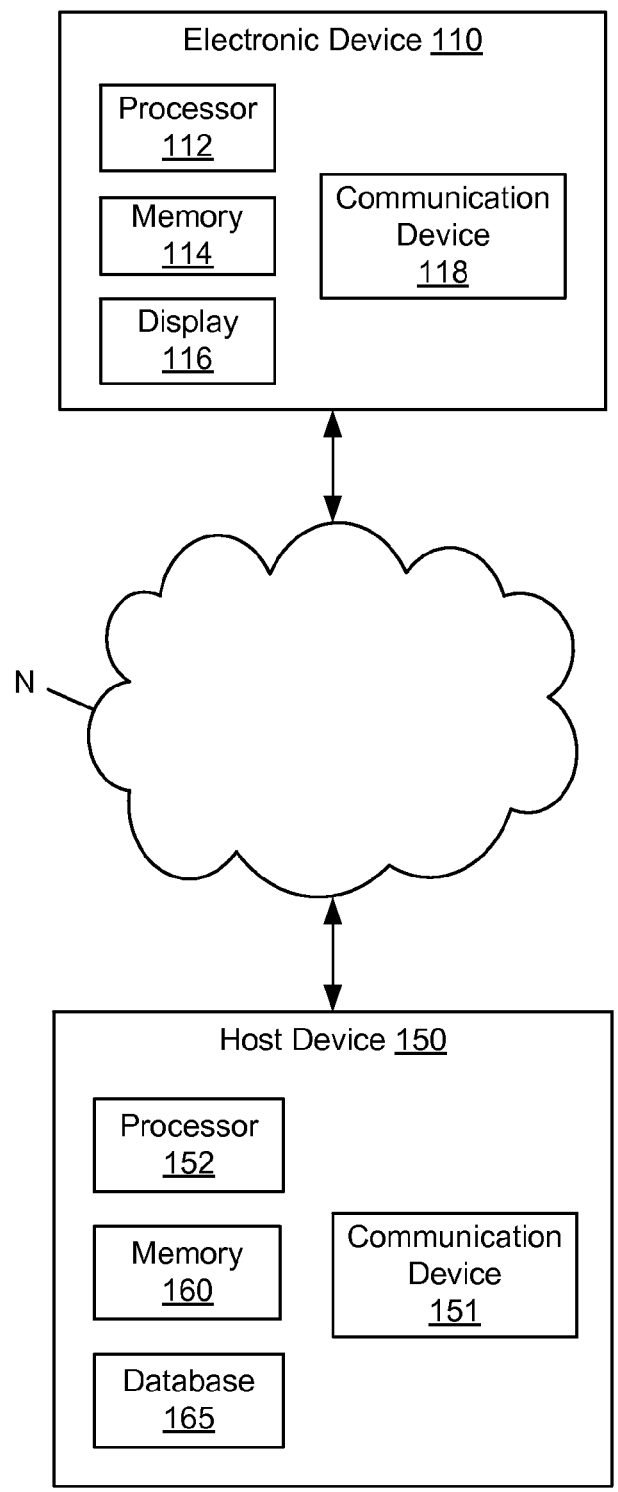
FIG. 1 is a schematic illustration of an electronic device in communication with a host device via a network, according to an embodiment.

In some embodiments, a method includes receiving at least one signal indicative that a first access point can transmit data over a first number of spatial streams, and a second access point can transmit data over a second number of spatial streams less than the first number of spatial streams. The method further includes receiving a probe request from each client device included in a set of client devices. The set of client devices includes a first portion of client devices configured to transmit data over the first number of spatial streams and a second portion of client devices configured to transmit data over the second number of spatial streams. The method includes sending a signal to each client device in the first portion associated with authorizing the client devices to connect to the first access point. The method further includes sending a signal to each client device in the second portion associated with authorizing the client devices to connect to the second access point.

In some embodiments, an apparatus includes a load management module configured to be operatively coupled to a first access point configured to transmit data over a first number of spatial streams, and a second access point configured to transmit data over a second number of spatial streams less than the first number of spatial streams. The load management module can receive, at a first time and from a client device configured to transmit data over the first number of spatial streams, a request to connect to a network via the second access point and can send to the client device a denial in response to the request. The load management module can receive, from the client device at a second time, a request to connect to a network via the first access point and can send to the client device a signal such that the client device is operatively coupled to the network via the first access point.

In some embodiments, an apparatus includes a load management module operatively coupled to a first access point configured to transmit data over a first number of spatial streams and a second access point configured to transmit data over a second number of spatial streams less than the first number of spatial streams. The load management module can receive a probe request from a client device that is configured to transmit data over the first number of spatial streams. The load management module is configured to send a signal to the client device when a signal strength value associated with the first access point and the client device is less than a signal strength value associated with the second access point and the client device and above a predetermined threshold such that the client device is operatively coupled to the first access point.

As used in this specification, the term "spatial streams" relates generally to the number of independent and separately encoded data signals sent from a wireless communication device. For example, in multiple-input and multiple-output (MIMO) wireless communication between two wireless communication devices, an independent and separately encoded data signal can be sent from and/or received by each antenna included in the two wireless communication devices. Furthermore, the number of spatial streams implemented in a MIMO communication between two wireless communication devices is limited by the wireless communication device capable of implementing the fewest spatial streams. For example, a transmission between a first wireless communication device capable of transmitting three spatial streams and a second wireless communication device capable of transmitting two spatial stream will be limited to the use of two spatial streams.

As used herein, the singular forms "a," "an" and "the" include plural referents unless the context clearly dictates otherwise. Thus, for example, the term "module" is intended to mean a single module or a combination of modules.

FIG. 1 is a schematic illustration of an electronic device 110 in communication with a host device 150 via a network N, according to an embodiment. The electronic device 110 can be, for example, a personal computer (PC), a personal digital assistant (PDA), a smart phone, a laptop, a tablet PC, a video game console, and/or the like. The host device 150 can be any suitable host device (e.g., an access point, a network management device, and/or the like). The network N can be any type of network (e.g., a local area network (LAN), a wide area network (WAN), a worldwide interoperability for microwave access network (WiMAX), a virtual network, a cellular network, and/or the internet) implemented, at least in part, as a wireless network.

In some embodiments, the network N can include one or more wireless access points (not shown in FIG. 1) configured to broadcast a wireless signal associated with the network N. Expanding further, the one or more wireless access points (WAPs) included in the network N can be configured to wirelessly transmit data over any number of spatial streams. For example, in some embodiments, a WAP can transmit data over one, two, three, or more spatial streams. In some embodiments, the network N can include multiple WAPs configured to transmit data over various wireless channels. In such embodiments, the arrangement of the multiple WAPs can increase the number of electronic devices (e.g., the electronic device 110) that can connect to the network N, as further described herein. In addition, the network N can include two or more WAPs that transmit data over a different number of spatial streams, as described in further detail herein.

The electronic device 110 (also referred to herein as "client device") includes at least a processor 112, a memory 114, a display 116, and a communication device 118. The memory 114 can be, for example, a random access memory (RAM), a memory buffer, a hard drive, a read-only memory (ROM), an erasable programmable read-only memory (EPROM), and/or the like. In some embodiments, the memory 114 of the electronic device 110 stores instructions to cause the processor 112 to execute modules, processes, and/or functions associated with using a personal computer application, mobile application, an internet web browser, and/or the like. In some embodiments, the memory 114 stores instructions to cause the processor 112 to send a probe request to the host device 150 associated with connecting to an access point, as described in further detail herein.

The processor 112 of the electronic device 110 can be any suitable processing device configured to run or execute a set of instructions or code. For example, the processor can be a general purpose processor (GPU), a central processing unit (CPU), an accelerated processing unit (APU), and/or the like. The processor 112 can be configured to run or execute a set of instructions or code stored in the memory 114 associated with using a personal computer application, a mobile application, an internet web browser, a cellular communication, and/or the like. In some embodiments, the processor 112 can run or execute a set of instructions to cause the communication device 118 to send a signal to and/or receive a signal from the network N, as further described herein.

The display 116 (FIG. 1) can be any suitable display configured to provide a user interface to the electronic device 110. For example, the display 116 can be a cathode ray tube (CRT) monitor, a liquid crystal display (LCD) monitor, a touch screen, or the like. The display 116 can be configured to provide the user interface for a personal computer application, mobile application, internet web browser, and/or the like. In some embodiments, the display 116 can be configured to graphically represent any suitable portion of the network N (e.g., a webpage, an email interface, and/or the like).

The communication device 118 of the client device 110 can be any suitable device or component configured to communicate with the network N. For example, the communication device 118 can include one or more network interface devices (e.g., a network interface card). As described in further detail herein, the communication device 118 can be configured to transmit data over any suitable number of spatial streams. For example, in some embodiments, the communication device 118 can be configured to transmit data over at least three spatial streams. In other embodiments, the communication device 118 can be configured to transmit data over less than three spatial streams (e.g., one spatial stream or two spatial streams). In this manner, the communication device 118 can be configured to wirelessly communicate with the one or more WAPs included in the network N. Moreover, the communication device 118 can be configured to send a signal to the host device 150 associated with a request to connect with the one or more WAPs, as further described herein.

The host device 150 can be any type of device configured to send data over the network N to and/or receive data from one or more electronic device 110. In some embodiments, the host device 150 can also send data over the network N to and/or receive data from one or more access points. The host device 150 can function as, for example, a server device (e.g., a web server device), a network management device, and/or so forth. For example, in some embodiments, the host device 150 can be an access point, a router, a switch, a server, or the like.

The host device 150 includes at least a communication device 151, processor 152, a memory 160, and a database 165. The communication device 151 can be any suitable device or component configured to communicate with the network N. For example, the communication device 151 can include one or more network interface devices (e.g., a network interface card). The memory 160 included in the host device 150 can be, for example, a random access memory (RAM), a memory buffer, a hard drive, a database, a read-only memory (ROM), an erasable programmable read-only memory (EPROM), an electrically erasable read-only memory (EEPROM), and/or any other suitable memory. The memory 160 of the host device 150 can include or store a set of instructions used to balance a communication load, for example, a radio frequency (RF) load (also referred to herein as "load") across a set of access points included in the network N. For example, in some embodiments, the host device 150 can authorize or reject a probe request from the client device 110 associated with connecting to an access point (included in the network N), as described in further detail herein.

In some embodiments, the memory 160 stores instructions to cause the processor 152 to execute modules, processes and/or functions. The processor 152 can be any suitable processor such as, for example, a general purpose processor (GPU), a central processing unit (CPU), a network processor, a front end processor, and/or the like. As such, the processor 152 is configured to perform a set of instructions stored in the memory 160. For example, the processor 152 can be configured to authorize or reject a probe request from the client device 110 associated with connecting to an access point. In some embodiments, the processor 152 can be configured to monitor, query, and/or update the database 165. For example, in some embodiments, the processor 152 can update the database 165 with state information associated with a current load on the access points included in the network N (e.g., the access points are in communication with the communication device 151 of the host device 150 such that the communication device 151 receives the states information associated with the access points).

The database 165 can be any suitable database such as, for example, a relational database, an object database, an object-relational database, a hierarchical database, a network database, an entity-relationship database, and/or the like. In some embodiments, the database 165 can be stored in, for example, the memory 160. While shown in FIG. 1 as being included in the host device 150, in other embodiments the database 165 can be physically separate from and operably coupled to the host device 150. For example, the host device 150 can be configured to communicate with the database 165 over the network N (e.g., the database 165 can be included or stored in the memory of a network-attached storage device (NAS) (not shown)). In some embodiments, the database 165 can store and/or maintain data associated with a current state of any number of access points included in the network N. For example, in some embodiments, the database 165 can store information associated with a current load experienced by one or more access points. In some embodiments, the database 165 can store information associated with the number of spatial streams an access point can transmit data over. For example, in some embodiments, the database 165 can store information indicative that a first access point included in the network N can transmit data over three spatial streams while a second access point included in the network N can transmit data over two spatial streams. In this manner, the processor 152 of the host device 150 can query the database 165 for the information and can balance the load experienced by the access points included in the network N, as described in further detail herein.

Figure 2:
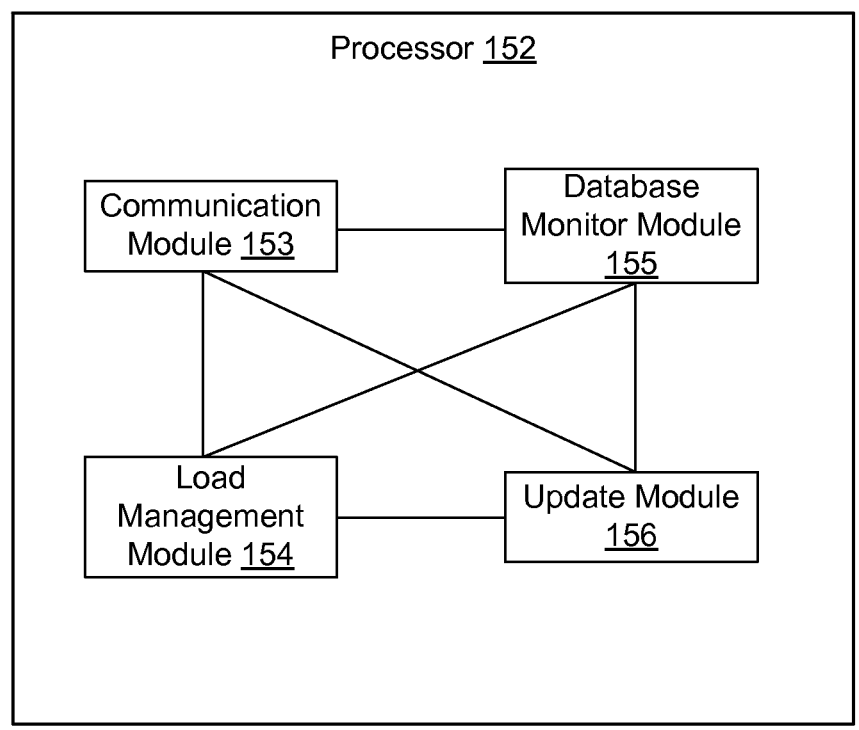
FIG. 2 is a schematic illustration of a processor included in the host device of FIG. 1.

Referring now to FIG. 2, the processor 152 of the host device 150 can include or execute specific modules. The modules can be, for example, hardware modules, software modules stored in the memory 160 (FIG. 1) and executed in the processor 152, and/or any combination thereof. The processor 152 can include a communication module 153, a load management module 154, a database monitor module 155, and an update module 156. The communication module 153 includes a set of instructions executed by the processor 152 associated with communicating with the network N and more specifically one or more access points included in the network N (not shown in FIGS. 1 and 2).

The database monitor module 155 includes a set of instructions executed by the processor 152 associated with monitoring the database 165. For example, the database monitor module 155 can include instructions such that the host device 150 queries the database 165 to determine how many spatial streams an access point can use to transmit data, as described above. The update module 156 includes a set of instructions executed by the processor 152 associated with updating the database 165. For example, in some embodiments, if the number of client devices (e.g., client device 110) associated with an access point is above a threshold, the update module 156 can update the database 165 to reflect that the access point is not available to connect to additional client devices.

The load management module 154 includes a set of instructions executed by the processor 152 associated with balancing a load experienced by the one or more access points included in the network. In some embodiments, the load management module 154 can include instructions such that the host device 150 balances the load seen by an access point based at least in part on the number of spatial streams the access point can use to transmit data. For example, in some embodiments, the network N can include a first access point configured to transmit data over three spatial streams and a second access point configured to transmit data over two spatial streams. In such embodiments, a client device (e.g., an electronic device 110) can be configured to transmit data over two spatial streams and can send a signal to the load management module 154 associated with a request to connect to the first access point. In such embodiments, the load management module 154 can, for example, send a signal to the database monitor module 155 to determine the number of spatial streams the first access point is capable of using and the number of spatial streams the second access point is capable of using. In this manner, the load management module 154 can determine the first access point is capable of using three spatial streams and can send a signal associated with rejecting the request to connect to the first access point. With the request to connect to the first access point rejected, the client device can be configured to send a second signal to the load management module 154 associated with a request to connect to the second access point. With the client device and the second access point configured to transmit data over two spatial streams, the load management module 154 can send a signal associated with authorizing the client device to connect to the second access point. Thus, the load management module 154 can balance the load on the first access point and the second access point based, at least in part, on the number of spatial streams.

In some instances, the load management module 154 can include a set of instructions associated with balancing the load on one or more access points based on any other additional parameters (e.g., in addition to the number of spatial streams). For example, in some instances, the load management module 154 can balance the load on one or more access points based at least in part on the number of client devices connected to an access point, the available bandwidth of the access point, the signal strength between the access point and the client device, and/or any other suitable parameter or metric. In this manner, the load management module 154 can be configured to manage the load experienced over any number of access points connected to a network (e.g., the network N).

Figure 3:
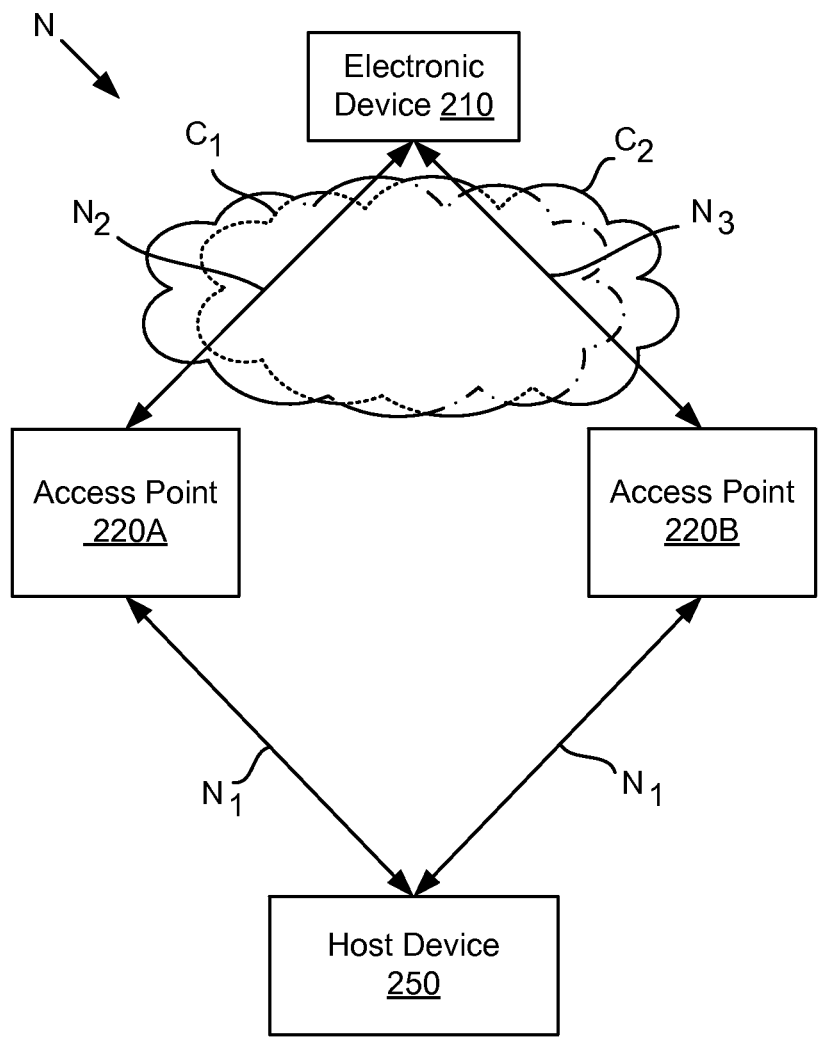
FIG. 3 is a schematic illustration of a portion of a network, according to an embodiment.

Referring now to FIG. 3, a network N can include or be operatively coupled to at least one electronic device 210, a first access point 220A, a second access point 220B, and a host device 250. The electronic device 210 can be any suitable electronic device. For example, in some embodiments, the electronic device 210 (also referred to herein as "client device") is similar to or the same as the electronic device 110 described above. In this manner, the electronic device 210 can be, for example, a WiFi-enabled PC, a laptop, a smart phone, a tablet PC, a PDA, etc. Thus, the electronic device 210 can include a network interface device or component such as a network card. In some instances, the electronic device 210 can be configured such that the network interface device can transmit data over three spatial streams, as described in further detail herein.

The host device 250 can be any suitable device. For example, in some embodiments, the host device 250 can be similar to the host device 150 described above. In this manner, the host device 250 can be, for example, a web server, a network management device, an access point, a switch, a router, or any other suitable device. Moreover, the host device 250 can include any suitable module or modules configured to communicate with any electronic device (e.g., the electronic device 210, the first access point 220A, and/or the second access point 220B) included in the network N.

The host device 250 can be operatively coupled to the first access point 220A and the second access point 220B. As shown in FIG. 3, the host device 250 can communicate with the first access point 220A and the second access point 220B via a first communication mode $N_1$ of the network N. For example, in some embodiments, the host device 250 can communicate with the first access point 220A and the second access point 220B via an Ethernet connection (e.g., a wired connection). In other embodiments, the first access point 220A and the second access point 220B can communicate with the host device 250 via a wireless connection. In this manner, the host device 250 can include any suitable hardware and/or software configured to control at least a portion of the first access point 220A and the second access point 220B, as described in further detail herein.

The first access point 220A and the second access point 220B can be any suitable device configured to transmit a wireless signal associated with the network N. The first access point 220A and the second access point 220B can be substantially similar, or can be different. The first access point 220A, for example, can transmit data over a first number of spatial streams and the second access point 220B can transmit data over a second number of spatial streams, different from the first number of spatial streams. For example, the first access point 220A can transmit data over three spatial streams while the second access point 220B can transmit data over two spatial streams.

The first access point 220A can transmit a wireless signal associated with the network N via a second communication mode $N_2$ and the second access point 220B can transmit a wireless signal associated with the network N via a third communication mode $N_3$. More specifically, the second communication mode $N_2$ can be implemented using a first channel associated with the first access point 220A and the third communication mode $N_3$ can be implemented using a second channel associated with the second access point 220B. Moreover, the first access point 220A and the second access point 220B can be configured to broadcast the same service set identification (SSID) associated with the network N.

As shown in FIG. 3, a coverage area $C_1$ of the first access point 220A and associated with the second communication mode $N_2$ and a coverage area $C_2$ of the second access point 220B and associated with the third communication mode $N_3$ can be configured to at least partially overlap. Thus, the number of electronic devices that can connect to the network N is increased (e.g., the collective bandwidth of the first access point 220A and the second access point 220B is greater than a single access point with a similar coverage area).

In use, the client device 210 can send, for example, a signal associated with a request to connect to the second access point 220B. In some instances, a signal strength between the client device 210 and the second access point 220B can be greater than a signal strength between the client device 210 and the first access point 220A (e.g., the network interface device can be configured to first attempt to an access point with the greatest signal strength). In some instances, the second access point 220B can forward the signal associated with the request to connect to the second access point 220B from the client device 210 to the host device 250 (e.g., the request signal is forward in the same form, for example, the second communication mode $N_2$). In some instances, the form of the request signal can change (e.g., from the second communication mode $N_2$ to the first communication mode $N_1$). In some instances, the host device 250 and the second access point 220B can each receive the request signal from the client device 210.

The host device 250 can also receive a signal associated with or identifying the number of spatial streams the client device 210, the first access point 220A, and the second access point 220B are each capable of transmitting data over (e.g., three spatial streams for the client device 210, three spatial streams for the first access point 220A, and two spatial streams for the second access point 220B, as described above).

The host device 250 (e.g., a load management module) can determine that the client device 210 is attempting to connect to an access point having lower spatial stream capabilities. Therefore, the host device 250 can send a signal associated with a denial response to the second access point 220B which, in turn, can send a signal associated with the denial response to the client device 210. After receiving the denial response the client device 210 can send a second signal associated with a request to connect to the first access point 220A. The host device 250 can receive from the first access point 220A a signal associated with the request to connect to the first access point 220, and upon determining the client device 210 and the first access point 220A are each capable of transmitting data over three spatial streams, the host device 250 can send a signal to the client device 210 associated with an authorization response. In this manner, the client device 210 can connect to the network N via the second communication mode $N_2$ of the first access point 220A.

Although the network N is shown in FIG. 3 as including one electronic device 210 connected thereto, in some embodiments, any number of electronic devices can be connected to the first access point 220A and/or the second access point 220B. As such, the host device 250 can be configured to balance the load of the first access point 220A and the second access point 220B based at least in part on, for example, the number of spatial streams and the number of client devices connected to the access points 220A and 220B. For example, in some embodiments, a client device configured to transmit data over three spatial streams can send a signal associated with a request to connect to the first access point 220A. As described above, the host device 250 can receive a signal from the first access point 220A associated with the request, the spatial stream capabilities of the first access point 220A and the client device, and the number of client devices connected to the first access point 220A. The host device 250 can determine that the client device and the first access point 220A are each configured to transmit data over three spatial streams and that the number of client devices connected thereto is at a predetermined load threshold. In such instances, the host device 250 can be configured to send associated with a denial response to the first access point 220A based at least in part on the number of client devices connected to the first access point 220A. The first access point 220A can, in turn, send a signal to the client device associated with the denial response. In response, the client device can send a second signal associated with a request to connect to the second access point 220B; the host device 250 can receive a signal from the second access point 220B associated with the request and can send a response signal associated with an authorization response to the second access point 220B. The second access point 220B can, in turn, sends a signal associated with the authorization response to the client device. Thus, the client device can connect to the second access point 220B despite being able to transmit data over three spatial streams. In this manner, the host device 250 can be configured to balance the load on the first access point 220A and the second access point 220B based at least in part on the number of spatial streams and a number of connected devices.

In other embodiments, the host device 250 can be configured to send signal associated with rejecting or authorizing a request to connect based at least in part on a signal threshold. For example, in some embodiments, the client device 210 can send a signal associated with a request to connect to the first access point 220A. In such embodiments, the host device 250 can determine that the signal strength between the client device 210 and the first access point 220A is less than the signal strength between the client device 210 and the second access point 220B and less than a predetermined signal-strength threshold. Therefore, the host device 250 can send a signal associated with a denial response to the first access point 220A. The first access point 220A can, in turn, send a signal associated with the denial response to the client device. In response, the client device 210 can send a second signal associated with a request to connect to the second access point 220B; the host device 250 can receive a signal from the second access point 220B associated with the request and can send a response signal associated with an authorization response to the second access point 220B. The second access point 220B, in turn, sends a signal associated with the authorization response to the client device. Thus, the client device 210 can connect to the second access point 220B despite being able to transmit data over three spatial streams.

In some instances, the signal strength between the client device 210 and the first access point 220A can be less than the signal strength between the client device 210 and the second access point 220B while being above a predetermined signal-strength threshold. Therefore, with the client device 210 and the first access point 220A being capable to transmit data over three spatial streams, the host device 250 can be configured to send an authorization response to the client device 210 such that the client device 210 can connect to the first access point 220A. In this manner, the host device 250 can be configured to balance the load on the first access point 220A and the second access point 220B based at least in part on the number of spatial streams and a signal strength between a client device and an access point.

In some instances, a client device (e.g., similar to or the same as electronic device 210) can be configured to transmit data over a number spatial streams that is less than the number of spatial streams used to transmit data by any access point included in a network. In such instances, the client device can send a signal associated with a request to connect to an access point (e.g., the first access point 220A) and the host device 250 can be configured to send a denial response until the client device sends a signal associated with a request to connect to an access point included in the network that transmits data over the fewest number of spatial streams or a lower number of spatial streams.

While the network N is shown in FIG. 3 as including the first access point 220A and the second access point 220B, in some embodiments, the network N can include any suitable number of access points. The access points can be configured to transmit data over a similar number of spatial streams or a different number of spatial streams. For example, in some embodiments, the network N can include a first access point, a second access point, and a third access point. In such embodiments, the first access point and the third access point can transmit data over a first number of spatial streams and the second access point can transmit data over a second number of spatial streams, less than the first number. In this manner, a host device (e.g., the host device 250) can be configured to balance a load on the access points such that the first and third access point are connected to client devices capable of transmitting data over the first number of spatial streams and the second access point is connected to client devices capable of transmitting data on the second number of spatial streams or a fewer number of spatial streams. Furthermore, with both the first access point and the second access point capable of transmitting data over the first number of spatial streams, the host device can further balance the load of the first access point and the third access point based at least in part on signal strength, number of connected client devices, available bandwidth, and/or any other suitable parameter.

Figure 4:
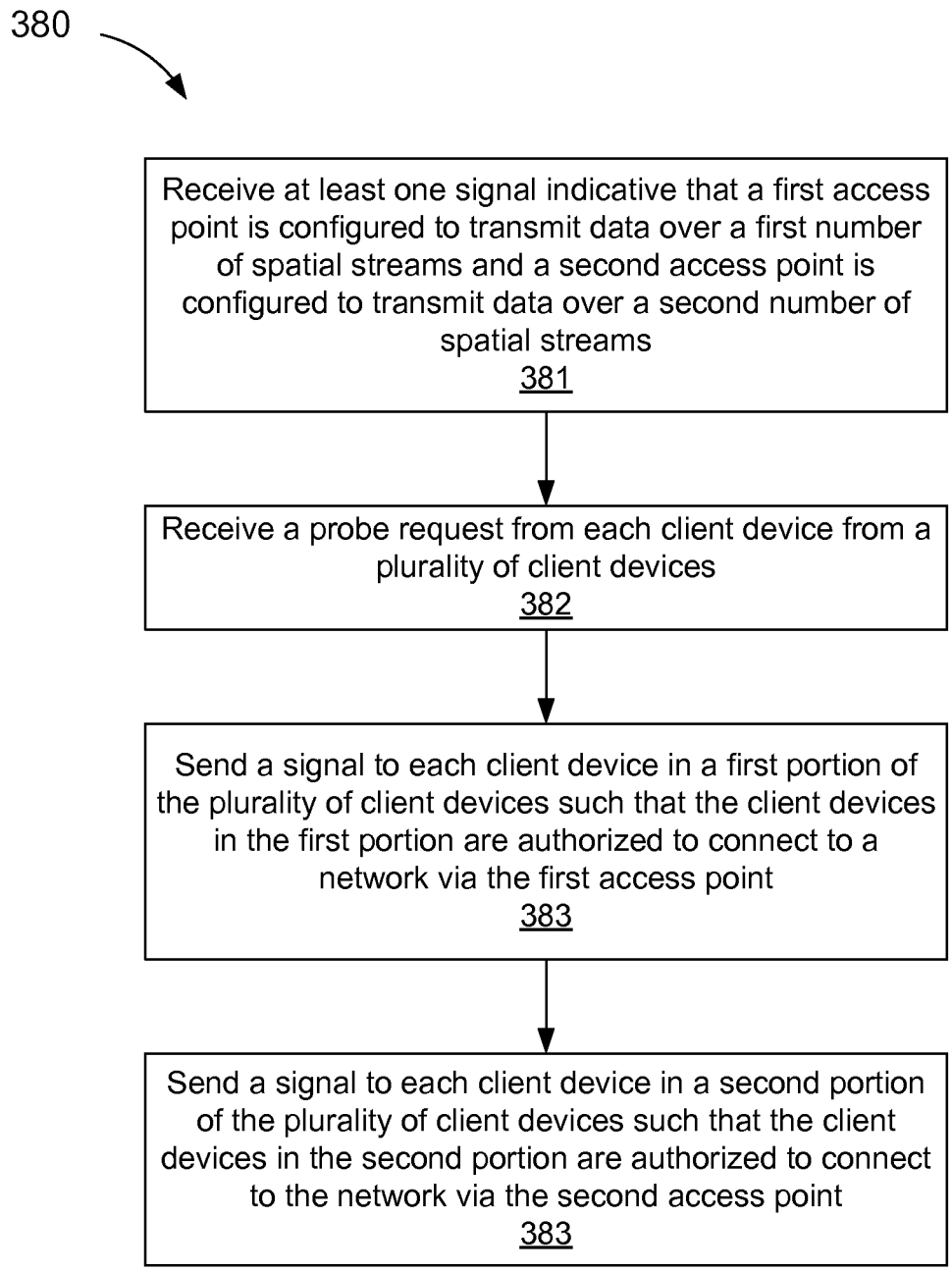
FIG. 4 is a flow chart illustrating a method of balancing an RF load according to spatial stream capabilities, according to an embodiment.

FIG. 4 is a flowchart illustrating a method for balancing an RF load, according to an embodiment. The method 380 includes receiving at least one signal indicative that a first access point is configured to transmit data over a first number of spatial streams and a second access point is configured to transmit data over a second number of spatial streams, less than the first number of spatial streams, at 381. For example, a host device such as the host device 250 (FIG. 3) can receive the at least one signal. The host device can store a set of information associated with the at least one signal in a memory (e.g., in a database included in the memory).

A probe request is received from each client device included in a set of client devices, at 382. In some instances, the set of client devices can include a first portion that can transmit data over the first number of spatial streams and a second portion that can transmit data over the second number of spatial streams. At 383, a signal is sent to each client device in the first portion of client devices such that the first portion of client devices are authorized to connect to a network via the first access point. At 384, a signal is sent to each client device in the second portion of client devices such that the second portion of client devices are authorized to connect to the network via the second access point. Expanding further, in some instances, the second portion of the client devices sends a signal associated with a request to connect to the first access point. In such instances, a signal associated with a denial response can be sent (e.g., from a host device or the like) to the second portion of the client devices. After receiving the denial response, the second portion of the client devices can send a signal associated with a request to connect to the second access point and a response signal can be sent such that the second portion can connect to the network via the second access point.

In some instances, the set of client devices can include a third portion configured to transmit data over a third number of spatial streams less than the second number of spatial streams. In such instances, a signal can be sent to the third portion of the client devices such that the third portion can connect to the network via the second access point. A denial response can be sent to a number of client devices included in the first portion when a load value has been reached. For example, a denial response can be sent to the number of client devices included in the first portion when the available throughput of the first access point is below a load value or threshold. A signal can be sent to the number of client devices in the first portion such that the number of client devices can connect to the network via the second access point. The load value or threshold can be, for example, a number of client devices connected to the first access point.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals (e.g., a propagating electromagnetic wave carrying information on a transmission medium such as space or a cable). The media and computer code (also referred to herein as code) may be those designed and constructed for the specific purpose or purposes. Examples of non-transitory computer-readable media include, but are not limited to: magnetic storage media such as hard disks, optical storage media such as Compact Disc/Digital Video Discs (CD/DVDs), Compact Disc-Read Only Memories (CD-ROMs), magneto-optical storage media such as optical disks, carrier wave signal processing modules, and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.), or other programming languages and/or other development tools. Additional examples of computer code include, but are not limited to, control signals, encrypted code, and compressed code.

While various embodiments have been described above, it should be understood that they have been presented by way of example only, and not limitation, and as such, various changes in form and/or detail may be made. Any portion of the apparatus and/or methods described herein may be combined in any suitable combination, unless explicitly expressed otherwise. Where methods and/or schematics described above indicate certain events and/or flow patterns occurring in certain order, the ordering of certain events and/or flow patterns may be modified. Additionally certain events may be performed concurrently in parallel processes when possible, as well as performed sequentially.

What is claimed:

1. A method, comprising:
receiving at least one signal indicative that (1) a first access point is configured to transmit data over a maximum number of spatial streams equal to a first number of spatial streams, and (2) a second access point is configured to transmit data over a maximum number of spatial streams equal to a second number of spatial streams less than the first number of spatial streams;
receiving a probe request from each client device from a plurality of client devices, a first portion of the plurality of client devices configured to transmit data over a maximum number of spatial streams equal to the first number of spatial streams, a second portion of the plurality of client devices configured to transmit data over a maximum number of spatial streams equal to the second number of spatial streams;
sending a signal to each client device from the first portion of the plurality of client devices such that that client device is authorized to connect to a network via the first access point; and
sending a signal to each client device from the second portion of the plurality of client devices such that that client device is authorized to connect to the network via the second access point based on the second portion of the plurality of client devices being configured to transmit data over the maximum number of spatial streams equal to the second number of spatial streams.

2. The method of claim 1, wherein the plurality of client devices is a first plurality of client devices, the method further comprising:
receiving a probe request from each client device from a second plurality of client devices, the second plurality of client devices configured to transmit data over a third number of spatial streams less than the second number of spatial streams; and
sending a signal to each client device from the second plurality of client devices such that that client device is authorized to connect to the network via the second access point.

3. The method of claim 1, further comprising:
receiving a probe request from a client device from the second portion of the plurality of client devices requesting access to the network via the first access point; and
sending a signal to the client device from the second portion of the plurality of client devices such that the client device is not authorized to connect to the network via the first access point.

4. The method of claim 1, wherein the plurality of client devices is a first plurality of client devices, the method further comprising:
receiving a probe request from each client device from a second plurality of client devices, the second plurality of client devices configured to transmit data over the first number of spatial streams; and
when a load value associated with the first access point is above a threshold, sending a signal to each client device from the second plurality of client devices such that that client device is authorized to connect to a network via the second access point.

5. The method of claim 4, wherein the load value is a number of client devices that are operatively coupled to the first access point.

6. The method of claim 4, wherein the load value is a throughput of the first access point.

7. The method of claim 1, wherein the first number of spatial streams is two.

8. An apparatus, comprising:
a load management module configured to be operatively coupled to (1) a first access point that is configured to transmit data over a first number of spatial streams, and (2) a second access point that is configured to transmit data over a second number of spatial streams less than the first number of spatial streams,
the load management module configured to receive, at a first time and from a client device that is configured to transmit data over the first number of spatial streams, a request to connect to a network via the second access point,
the load management module configured to send, to the client device, a denial in response to the request based on the client device being configured to transmit data over the first number of spatial streams greater than the second number of spatial streams,
the load management module configured to receive, at a second time after the first time and from the client device, a request to connect to the network via the first access point,
the load management module configured to send, to the client device, a signal such that the client device is operatively coupled to the network via the first access point.

9. The apparatus of claim 8, wherein the client device is a first client device, the apparatus further comprising:
the load management module configured to receive, at a third time after the second time and from a second client device that is configured to transmit data over the first number of spatial streams, a request to connect to the network via the first access point,
the load management module configured to send, to the second client device, a denial in response to the request based on a load value of the first access point.

10. The apparatus of claim 9, wherein the load value is a number of client devices operatively coupled to the first access point.

11. The apparatus of claim 8, wherein the client device is a first client device, the apparatus further comprising:
the load management module configured to receive, at a third time after the second time and from a second client device that is configured to transmit data over the first number of spatial streams, a request to connect to the network via the first access point,
the load management module configured to send, to the client device, a signal such that the second client device is operatively coupled to the network via the first access point.

12. The apparatus of claim 8, wherein the client device is a first client device, the apparatus further comprising:
the load management module configured to be operatively coupled to third access point that is configured to transmit data over a third number of spatial streams equal to the first number of spatial streams,
the load management module configured to receive, at a third time after the second time and from a second client device that is configured to transmit data over the first number of spatial streams, a request to connect to the network via the first access point,
the load management module configured to send, to the second client device, a denial in response to the request,
the load management module configured to receive, at a fourth time after the third time and from the second client device, a request to connect to the network via the third access point,
the load management module configured to send, to the second client device, a signal such that the second client device is operatively coupled to the network via the third access point.

13. The apparatus of claim 8, wherein the load management module is configured to receive a signal from the first access point indicating that the first access point is configured to transmit data over the first number of spatial streams.

14. The apparatus of claim 8, wherein the load management module is configured to send, to the client device, the denial in response to the request and based on the client device being configured to transmit data over the first number of spatial streams.

15. An apparatus, comprising:
a load management module configured to be operatively coupled to (1) a first access point that is configured to transmit data over a first number of spatial streams, and (2) a second access point that is configured to transmit data over a maximum number of spatial stream equal to a second number of spatial streams less than the first number of spatial streams,
the load management module configured to receive a probe request from a client device that is configured to transmit data over the first number of spatial streams,
when a signal strength value associated with the first access point and the client device is (1) less than a signal strength value associated with the second access point and the client device, and (2) above a predetermined threshold, the load management module configured to send, based on the client device being configured to transmit data over the first number of spatial streams, a signal to the client device such that the client device is operatively coupled to the first access point.

16. The apparatus of claim 15, wherein the first number of spatial streams is three.

17. The apparatus of claim 15, wherein the client device is a first client device, the apparatus further comprising:
the load management module configured to receive a probe request from a second client device that is configured to transmit data over a third number of spatial streams, less than the second number of spatial streams,
the load management module configured to send a signal to the second client device such that the second client device is operatively coupled to the second access point.

18. The apparatus of claim 15, further comprising when the signal strength value associated with the first access point and the client device is (1) less than the signal strength value between the second access point and the client device, and (2) below the predetermined threshold, the load management module configured to send a signal to the client device such that the client device is operatively coupled to the second access point.

19. The apparatus of claim 15, wherein the client device is a first client device, the apparatus further comprising:
the load management module configured to receive a probe request from a second client device that is configured to transmit data over the first number of spatial streams, the load management module configured to send a signal to the second client device such that the client device is operatively coupled to the first access point.

20. The apparatus of claim 15, wherein when a signal strength value associated with the first access point and the client device is less than a signal strength value between the second access point and the client device, the load management module configured to deny a request from the client device to operatively couple to the second access point.

* * * * *